United States Patent
Zucchelli (10) Patent No.: US 6,723,792 B2
(45) Date of Patent: Apr. 20, 2004

(54) NONEXTRUDED DISPERSIONS AND CONCENTRATES OF ADDITIVES ON OLEFIN POLYMERS

(75) Inventor: Ugo Zucchelli, Ferrara (IT)

(73) Assignee: Basell Poliolefine Italia S.p.A., Milan (IT)

( * ) Notice: Subject to any disclaimer, the term of this patent is extended or adjusted under 35 U.S.C. 154(b) by 0 days.

(21) Appl. No.: 10/129,747

(22) PCT Filed: Sep. 6, 2001

(86) PCT No.: PCT/EP01/10276
§ 371 (c)(1),
(2), (4) Date: May 9, 2002

(87) PCT Pub. No.: WO02/22732
PCT Pub. Date: Mar. 21, 2002

(65) Prior Publication Data
US 2003/0130436 A1 Jul. 10, 2003

(30) Foreign Application Priority Data
Sep. 15, 2000 (EP) .............................................. 00203184

(51) Int. Cl.⁷ .............................. C08L 23/10; C08J 3/20; C08J 3/22
(52) U.S. Cl. ....................... 525/191; 525/240; 521/134; 521/920; 523/201; 523/202
(58) Field of Search ................................ 525/191, 240; 521/134, 920; 523/201, 202

(56) References Cited

U.S. PATENT DOCUMENTS

| | | | |
|---|---|---|---|
| 4,724,225 A | 2/1988 | Shimizu et al. | 502/107 |
| 5,231,119 A | 7/1993 | Govoni et al. | 523/221 |
| 5,326,962 A | 7/1994 | Peng | 235/472 |
| 6,475,617 B1 * | 11/2002 | Branchesi et al. | 428/372 |

FOREIGN PATENT DOCUMENTS

| | | |
|---|---|---|
| EP | 0290149 | 11/1988 |
| EP | 0361493 | 4/1990 |
| EP | 0395083 | 10/1990 |
| EP | 0400333 | 12/1990 |
| EP | 0411628 | 2/1991 |
| EP | 0459208 | 12/1991 |
| EP | 0472946 | 3/1992 |
| EP | 0482600 | 4/1992 |
| EP | 0572028 | 12/1993 |
| EP | 0728769 | 8/1996 |

OTHER PUBLICATIONS

Himont Polymerisation Laboratory, Ferrara, Italy: "Catalysts for Polypropylene", Himont Incorporated, Italy; 1987 (pp. 6–7) Figure 14.

* cited by examiner

Primary Examiner—Nathan M. Nutter (57) ABSTRACT

A dispersion of one or more additives to be used in the processing of olefin polymers or copolymers, said dispersion comprising nonextruded particles of olefin polymers containing at least two immiscible polyolefinic phases and having internal voids partially or totally filled by the said additive or additives.

8 Claims, 1 Drawing Sheet

Figure 1

NONEXTRUDED DISPERSIONS AND CONCENTRATES OF ADDITIVES ON OLEFIN POLYMERS

This application is U.S. national phase of International Application PCT/EP01/10276, filed Sep. 6, 2001.

The present invention concerns dispersions and concentrates of additives, which can be used in processing polymers, particularly olefin polymers. It is known that in order to obtain better dispersion of additives in the finished polymeric products, and optimize the properties imparted to said finished products, it is preferable, and sometime necessary, to add the additives to the polymer in form of suitably prepared dispersions or concentrates.

Said dispersions or concentrates are generally obtained by dispersing from relatively low to high concentrations of the additives in materials which are compatible with the polymer materials constituting the finished products. In order to obtain the best usage economy, the concentrates should contain the highest possible quantity of additive while allowing an effective dispersion of the additive to be reached when said concentrates are diluted in polymer materials to obtain the finished products. For this purpose, the solution most commonly used in the art consists of coextruding the additive with a polymer compatible with the polymer materials which constitute the finished product, thus obtaining a concentrate in the form of pellets.

Said pellets are prepared in such a way that they can be used directly in the polymer processing plants.

On the other hand, in the field of olefin polymerization are taking hold, at the present time, some processes by which one can produce polymer particles in regular form, particularly spheroidal ones, and with a controlled particle size distribution.

Said polymer particles, because of their high flowability and absence of fines, can be used directly in the polymer processing plants and represent an economical alternative to the use of pellets. Further, single screw extruders are not designed to handle liquid or low melting additives. Above a concentration of 5–7 weight % of an additive a screw slipping occurs, which leads to a variable quality and a low yield in extruder production.

Moreover, one must remember that extrusion often leads to degradation, and therefore loss, of some of the additive used in preparing concentrates. Therefore, the need for additive dispersions and concentrates obtained directly from the above mentioned polymer particles, thus eliminating the extrusion stage, is strongly felt.

Said dispersions and concentrates should satisfy the typical requirements established in the relevant art, in particular:

1) high additive content in the case of concentrates;
2) ability of producing good dispersion of the additives when the concentrates are diluted in the polymer to be processed;
3) possibility of being used directly in the polymer transformation plants;
4) good storage stability and resistance to damage during transport and processing.

Useful solutions to this problem have been already disclosed in published European patent applications EP 290 149 and EP 459 208 and in U.S. Pat. Nos. 5,231,119 and 5,326,962. All these solutions have in common the fact of using polymer particles substantially consisting of a single polymer phase, selected from homopolymers and copolymers. Moreover, the said homopolymers and copolymers are characterized by a relatively high degree of crystallinity, and consequently, relatively high levels of melting temperature and heat of fusion, which limit their ability of producing good dispersions by mixing the concentrates with other polymers in the molten state. This problem can become dramatical when the said concentrates of the prior art are added to polymers with different crystalline structures or low degrees of crystallinity, as the compatibility between the two kinds of polymers (i.e. the polymer present in the concentrate and the polymer mixed with the concentrate) can become even very low.

Obviously, another limit of the said solutions is that generally the crystalline polymers are rigid and lack softness, so that they would adversely affect the mechanical properties of the polymers mixed with the concentrate, when flexibility and softness are desired.

Therefore it would be useful and desirable to obtain dispersions and concentrates from polymer particles containing two or more different polymeric phases, in order to optimize their compatibility with a large range of polymers, both in terms of miscibility and mechanical properties. This effect could be achieved to the maximum level by using the so called "polymer alloys" wherein the polymer phases are very finely and homogeneously dispersed, thus generating a polymer material which behaves, from many respects, as a single-phase polymer having intermediate properties between its components.

However in the prior art there is no appreciation of the possibility of preparing nonextruded dispersions and concentrates by using these kinds of polymer materials. In fact such polymer materials are generally prepared by sequential polymerization processes, wherein the various polymer phases are caused to grow and accumulate on the polymer particles produced in the preceding polymerization step(s), so that it is common belief that the subsequently added polymer phases tend to cover the surface and fill the voids of the growing polymer particle, thereby reducing drastically the presence of pores and cracks. Actually, the so obtained polymer particles show a relatively smooth surface.

However it has now been found that when such polymer materials are prepared by using certain kinds of polymerization catalysts, preferably carrying out one or more polymerization steps in gas phase, the resulting particles, even if having a rather smooth surface, result to be permeable to liquid additives due to the presence of through-going channels, making it possible for said liquid additives to penetrate inside the particles and fill, partially or totally, the internal voids that are present in such particles as another effect caused by the use of the said polmerization catalyst.

The only document known to the applicant wherein nonextruded polymer particles with an internal cavity are disclosed, is U.S. Pat. No. 4,724,225. However such document, even if suggesting the use of such particles for dispersing liquid additives, does not disclose or suggest how to produce dispersions or concentrates on polyolefin particles containing two or more different polymeric phases.

The distinction between dispersion and concentrate is purely based on the amount of dispersed additive. While the term "dispersion" is used here to define materials wherein the dispersed additive content is comprised in a wide range, indicatively from 0.5% up to 25% by weight, the term "concentrate" is used to define dispersions preferably containing at least 5% by weight of dispersed additive.

The object of the present invention, therefore, is to obtain a dispersion of one or more additives, in particular liquid or low melting additives, to be used in the processing of olefin polymers or copolymers, said dispersion comprising nonextruded particles of olefin polymers containing at least two immiscible polyolefinic phases and having internal voids partially or totally filled by the said additive or additives, wherein the amount of additive or additives present in the said internal voids is from 0.5 to 25% by weight, preferably from 0.5 to 20% by weight, with respect to the total weight of the dispersion.

A more specific object of the present invention is to obtain such dispersion in form of a concentrate of one or more additives, in particular liquid or low melting additives, to be used in the processing of olefin polymers or copolymers, said concentrate comprising nonextruded particles of olefin polymers containing at least two immiscible polyolefinic phases and having internal voids partially or totally filled by the said additive or additives, wherein the amount of additive or additives present in the said internal voids is from 5 to 25% by weight, preferably from 10 to 20% by weight, with respect to the total weight of the concentrate.

Nonextruded particles as used herein means as-polymerized particles not subjected to processing or treatments after polymerization. They can be however subjected to the typical treatments usually employed to inactivate the catalyst residues and wash the polymer, like steam treatments.

The said olefin polymer particles constitute the matrix of the dispersion or concentrate, as they contain the additives in the previously specified amounts. They are preferably spherical or spheroidal particles. Their average particle size and particle size distribution are preferably in the same ranges as defined hereinafter for the final dispersions or concentrates. In fact such features are substantially maintained unaltered from the polymer particles to the concentrates obtained from them.

As the said polymer particles are obtainable as a direct product of polymerization, and the polymerization conditions in different points of the polymerization reactor and at different times along the polymerization run are subject to slight fluctuations, the structure of the single particles can vary in terms of shape and volume of the internal voids, so that the content of additives can be different from particle to particle. However when the amount of additive present in the dispersion or concentrate is determined by weighting a significative sample (for instance not less than 0.5 g of dispersion or concentrate), the above said amounts of additive are found.

For "internal voids" it is meant that such voids are substantially closed inside the polymer particles, except that they communicate with the surface of the particle via through-going channels, in particular pores and/or cracks. Such channels are permeable to liquids and make it possible to fill the internal voids.

The presence of voids in the polymer particles is also revealed by the fact that, before being filled with the additives, such particles show an average pore volume and surface area, measured with the instrument "Porosimeter 2000", using the software "Milestone 2000" (both from C. Erba Instruments), generally falling in the following ranges:

pore volume: 100–500 mm$^3$/g;
surface area: 0.1–10 m$^2$/g.

The shape of such voids, in particular the fact that they are internal voids in the previously defined sense, becomes immediately evident when the polymer particles are sectioned and subjected to microscopical inspection.

Figure 1:
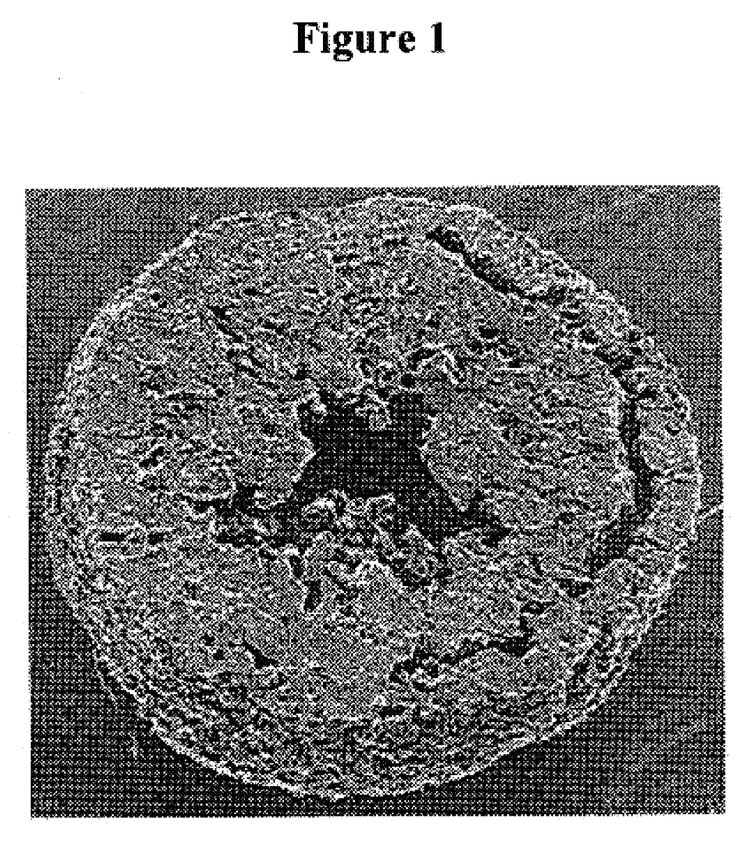

From particle to particle, the voids can result to be made up of a single cavity, (approximately in the center of the particle), and/or interconnected systems of cavities randomly, radially or concentrically distributed inside the particle. An example is shown in FIG. 1, which is a SEM picture of a sectioned particle having diameter of about 2.5 mm. Thanks to the said structure of the polymer particles, the dispersions and concentrates obtained from them result to be substantially dry on the surface and highly flowable, even when the additive is liquid at room temperature. Therefore the dispersions and concentrates of the present invention are substantially free from swollen and liquid layers on their outside surface, as demonstrated by the fact that they are highly flowable and suitable to be handled in conventional apparatuses for feeding polymers into processing plants.

For "immiscible phases" it is meant that it is possible to detect, for instance by microscopy, a continuous or discontinuous interface between such phases.

The said interface can be continuous when the concerned phases form a co—continuous structure, while it is discontinuous when the phases are dispersed in separate domains.

As previously said, the best overall properties are obtained when the polymer particles constituting the matrix of the dispersion or concentrate is made of or comprises a polymer alloy.

The polymer alloys are generally characterized by the fact that, after at least one stage of processing in the molten state (for instance extrusion, injection molding), the immiscible phases are capable of constituting a co—continuous structure, or a structure where the dispersed immiscible phases are in form of particles (domains) with an average particle size smaller than 5 $\mu$m, preferably smaller than 2 $\mu$m, or a co—continuous structure containing also the said domains.

In the nonextruded polymer particles the immiscible phases can constitute relatively larger domains.

Preferred values of particle size, size distribution and flowability for the dispersions and concentrates of the present invention are:

average particle size: 500–7000 microns;
particle size distribution: >95% by weight between 1000–4000 microns;
flowabilty 5–20 sec.

Flowability is the time needed for 100 g of polymer particles to flow through a funnel with an outlet hole of 1.27 cm in diameter, the walls of which are inclined of 20° with respect to the vertical direction.

When the olefin polymer particles used as the matrix of the dispersion or concentrate are spherical or spheroidal (which is a preferred case), the dispersions or concentrates result to be in form of spherical or spheroidal form as well.

Generally, the olefin polymers that can constitute the immiscible polyolefinic phases in the dispersions and concentrates of the present invention are polymers or copolymers, and their mixtures, of R—CH=CH$_2$ olefins where R is a hydrogen atom or a $C_1$–$C_8$ alkyl radical, or an aryl (in particular phenyl) radical. Particularly preferred are the following polymers:

a) isotactic, mainly isotactic or atactic propylene homopolymers, the isotatactic homopolymers having preferably an isotactic index higher than 80;

b) crystalline copolymers of propylene with ethylene and/or $C_4$–$C_{10}$ α-olefins of the above formula, where R is a $C_2$–$C_8$ alkyl or an aryl (in particular phenyl) radical, such. as for example 1-butene, 1-hexene, 1-octene, 4-methyl-1-pentene, wherein the total comonomer content ranges from 0.05% to 20% by weight, or mixtures of said copolymers with isotactic or mainly isotactic propylene homopolymers;

c) elastomeric copolymers of ethylene with propylene and/or a $C_4$–$C_{10}$ α-olefin of the said formula, generally containing from 20 to 80% by weight of ethylene, and optionally containing minor quantities (indicatively, from 0.5 to 15% by weight) of a diene, such as butadiene, 1,4-hexadiene, 1,5-hexadiene, ethylidene-norbornene;

d) homopolymers and copylmers of ethylene, in particular HDPE, LDPE, LLDPE;

e) styrene polymers.

Preferred values of Melt Flow Rate (MFR, according to norm ISO 1238L) and xylene soluble intrinsic viscosity $[\eta]$ for the said olefin polymers and their mixtures are:

MFR: 0.05–3000 g/10 min.;

Xylene soluble intrinsic viscosity $[\eta]$:0.5–7.5 dl/g.

In the olefin polymer particles used as the matrix of the dispersion or concentrate the total quantity of polymerized ethylene, when present, is preferably from 15% to 35% by weight, more preferably from 20 to 35% by weight.

Preferred examples of olefin polymers constituting the matrix of the dispersions and concentrates of the present invention are the heterophasic compositions comprising, in parts by weight:

A) 10–60, preferably 10–50 and more preferably 20–40 of homopolymer of propylene with isotactic index greater than 80, preferably from 85 to 98, or of a copolymer of propylene with ethylene, or a $CH_2$=CHR α-olefin where R is a 2–8 carbon alkyl radical or a combination thereof, which copolymer contains over 85%, preferably from 90 to 99% by weight of propylene, and has an isotactic index higher than 80;

B) 0–40, preferably 0–30, more preferably 2–15, of a copolymer fraction containing ethylene, insoluble in xylene at room temperature (about 23° C.);

C) 30–80, preferably 30–70, more preferably 40–70, of a copolymer fraction of ethylene and (i) propylene or (ii) another $CH_2$=CHR α-olefin, where R is a 2–8 carbon alkyl radical, or (iii) a combination thereof, optionally with minor amounts of a diene (such as butadiene, 1,4-hexadiene, 1,5-hexadiene, ethylidene-norbornene), containing from 20 to 80% by weight, preferably 25–75%, more preferably 25–70% by weight of ethylene, said fraction being also soluble in xylene at room temperature.

In such compositions, the component (A) constitutes one immiscible phase, and components (B) and (C) can be separated into two immiscible phases or form together a single immiscible phase. The said compositions are preferably in form of polymer alloy, in the previously defined sense.

The total quantity of copolymerized ethylene is preferably from 15% to 35% by weight, more preferably from 20 to 35% by weight.

Component (B) is preferably a copolymer of ethylene with the same α-olefins present in (C). Preferably the amount of ethylene in (B) is of 40% or 50% by weight or more, in particular 80% by weight or more.

Said compositions, moreover, have a flexural modulus of less than 1000 MPa, preferably less than 700 MPa, generally from 20 to 500 MPa.

The diene, when present, is typically in an amount of from 0.5 to 10% by weight with respect to the weight of (B)+(C).

The additives to be added to the matrix to obtain the dispersions and concentrates of the present invention should be liquid at room temperature or at a temperature lower than the melting or softening point of the olefin polymer constituting at least one of the phases (preferably at least one continuous phase) in the matrix. Preferably the additives should be liquid at a temperature at least 20° C. lower than the melting or softening point of at lest one of the said phases.

It is however to be considered that also additives which, in pure state, are not liquid at such temperatures can be used, as they can be added in form of solutions or eutectic mixtures with other additives or substances that can act as solvents or produce mixtures having a lower melting point.

In alternative, such additives, in particular process coadiuvants and modifiers, colors, may be dispersed in form of fine particles in a liquid carrier to give a suspension. The carriers generally contain surfactants to disperse the additive, diluents to control viscosity, and various other substances to aid compatibility in various resins and reduce settling. Preferably the average size of the said particles in the suspension is equal to or higher than 1 μm.

The term "additive" is meant to embrace any substance that can be added to a base polymer to modify its structure and/or properties, therefore any distinction between additives and other substances generally added to polymers is not valid in the case of the present invention. Examples of such additives are hereinafter given.

1) Stabilizers.

Specific examples of stabilizers are:

antacids, such as sodium lactate (concentrate aqueous solution) and epoxidized soybean oil;

light and thermal stabilizers, such as hindered amines, oligomeric polysiloxane hindered amines, low basicity N-methyl or N-alkyl hindered amines, for instance polymethylpropyl 3-oxy-[4(2,2,6,6tetramethyl) piperidinyl]siloxane or bis-(1-octyloxy-2,2,6,6, tetramethyl-4-piperidinyl)sebacate or N-butyl-2,2,6,6-teramethyl-4-piperidinamine or 4-amino-2,2,6,6-tetra methylpiperidine;

antioxidants, such as phenols and phosphites, for instance polydialkylsiloxanes containing siloxy units having pendant sterically hindered phenols, or tri(nonyl phenyl) phosphite or octyl diphenyl phosphite;

thermal stabilizers such as thioesters and thioethers, for instance pentaerythrityl hexylthiopropionate or dilauryl thiodipropionate;

2) Processing coadiuvants and modifiers.

Specific examples are:

lubricant and antistatic agents, as for example glyceryl monostearate, waxes and paraffin oils and ethoxylated amines;

molecular weight and rheology modifiers, such as peroxides (for instance dicumylperoxide; tert. Butylcumylperoxide; di(tert.butylperoxy isopropyl)benzene; 2,5-dimethyl-2,5-di(tert.butylperoxy)hexane; di(tert.butyl) peroxide; 3,3,6,6,9,9,-hexamethyl-1,2,4,5-tetraoxa cyclononane);

coupling and crosslinking agents, such as maleic anhydride and vinyl trimethoxy silane; amino silanes; bifunctional polysulfidic organosilanes; organic titanates;

silicone oils and other silicon based additives; such as polydimethylsiloxanes or modified amino, epoxy or methacrylate polydimethylsiloxanes;

plasticizers, for instance hydrocarbon oils, poly-α-olefin oligomes, esters, phosphates, that are incorporated into thermoplastic blends composition to improve flexibility, low temperature properties, sealing, processability and other properties; in particular, aromatic, naphthenic and paraffinic oils; α-alkene oligomers liquid at room temperature; liquide adipates, tallates, sebacates, oleates, glutarates, trimellitates, citrates; 2-ethylhexyl diphenyl phosphate and triaryl phosphate ester;

anti-fogging and antistatic agents (for example sorbitan esters, glycerol esters, glycerol fatty acid esters, alkyl sulphonates, penta-erytritol esters, ethoxylated synthetic amines, polyoxyethylene sorbitan laurate, glycerol oleate);

crosslinking coagents such as triallylcyanurate, triallylisocyanurate, triallylphosphate, triallyltrimellitate, diallylphthalate, pentaerythritol triacrylate, liquid polybutadiene, isophoronmaleammic acid (IPM);

dyes and liquid colour pastes.

The nonextruded particles of olefin polymers to be used in the preparation of the dispersions and concentrates of the present invention can be prepared by sequential polymerization in at least two polymerization steps. Such polymerization is carried out in the presence of stereospecific Ziegler-Natta catalysts. An essential component of said catalysts is a solid catalyst component comprising a titanium compound having at least one titanium-halogen bond, and an electron-donor compound, both supported on a magnesium halide in active form. Another essential component (co-catalyst) is an organoaluminum compound, such as an aluminum alkyl compound.

An external donor is optionally added.

The solid catalyst components used in said catalysts comprise, as electron-donors (internal donors), compounds selected from the group consisting of ethers, ketones, lactones, compounds containing N, P and/or S atoms, and esters of mono- and dicarboxylic acids. Particularly suitable electron-donor compounds are phthalic acid esters, such as diisobutyl, dioctyl, diphenyl and benzylbutyl phthalate.

Other particularly suitable electron-donor compounds are 1,3-diethers of formula:

wherein $R^I$ and $R^{II}$ are the same or different and are $C_1$–$C_{18}$ alkyl, $C_3$–$C_{18}$ cycloalkyl or $C_7$–$C_{18}$ aryl radicals; $R^{III}$ and $R^{IV}$ are the same or different and are $C_1$–$C_4$ alkyl radicals; or are the 1,3-diethers in which the carbon atom in position 2 belongs to a cyclic or polycyclic structure made up of 5, 6, or 7 carbon atoms, or of 5-n or 6-n' carbon atoms, and respectively n nitrogen atoms and n' heteroatoms. selected from the group consisting of N, O, S and Si, where n is 1 or 2 and n' is 1, 2, or 3, said structure containing two or three unsaturations (cyclopolyenic structure), and optionally being condensed with other cyclic structures, or substituted with one or more substituents selected from the group consisting of linear or branched alkyl radicals; cycloalkyl, aryl, aralkyl, alkaryl radicals and halogens, or being condensed with other cyclic structures and substituted with one or more of the above mentioned substituents that can also be bonded to the condensed cyclic structures; one or more of the above mentioned alkyl, cycloalkyl, aryl, aralkyl, or alkaryl radicals and the condensed cyclic structures optionally containing one or more heteroatoms as substitutes for carbon or hydrogen atoms, or both.

Ethers of this type are described in published European patent applications 361493 and 728769.

Representative examples of said dieters are 2-methyl-2-isopropyl-1,3-dimethoxypropane, 2,2-diisobutyl-1,3-dimethoxypropane, 2-isopropyl-2-cyclopentyl-1,3-dimethoxypropane, 2-isopropyl-2-isoamyl-1,3-dimethoxypropane, 9,9-bis (methoxymethyl) fluorene.

In the solid catalyst component the titanium compound, expressed as Ti, is generally present in an amount from 0.5 to 10% by weight. The quantity of electron-donor compound which remains fixed on the solid catalyst component generally is 5 to 20% by moles with respect to the magnesium dihalide.

The titanium compounds which can be used for the preparation of the solid catalyst component are the halides and the halogen alcoholates of titanium. Titanium tetrachloride is the preferred compound.

The active form of magnesium halide in the solid catalyst component can be recognized by the fact that in the X-ray spectrum of the catalyst component the maximum intensity reflection appearing in the spectrum of the nonactivated magnesium halide (having a surface area smaller than 3 $m^2/g$) is no longer present, but in its place there is a halo with the maximum intensity shifted with respect to the position of the maximum intensity reflection of the nonactivated magnesium dihalide, or by the fact that the maximum intensity reflection shows a width at half-peak at least 30% greater than the one of the maximum intensity reflection which appears in the spectrum of the nonactivated magnesium halide. The most active forms are those where the above mentioned halo appears in the X-ray spectrum of the solid catalyst component.

Among magnesium halides, the magnesium chloride is preferred. In the case of the most active forms of magnesium chloride, the X-ray spectrum of the solid catalyst component shows a halo instead of the reflection which in the spectrum of the nonactivated chloride appears at 2.56 Å.

The Al-alkyl compounds used as co-catalysts comprise the Al-trialkyls, such as Al-triethyl, Al-triisobutyl, Al-tri-n-butyl, and linear or cyclic Al-alkyl compounds containing two or more Al atoms bonded to each other by way of 0 or N atoms, or $SO_4$ or $SO_3$ groups.

The Al-alkyl compound is generally used in such a quantity that the Al/Ti ratio be from 1 to 1000.

The electron-donor compounds that can be used as external donors include aromatic acid esters such as alkyl benzoates, and in particular silicon compounds containing at least one Si—OR bond, where R is a hydrocarbon radical.

Examples of silicon compounds are (tert-butyl)$_2$ Si (OCH$_3$)$_2$, (cyclohexyl) (methyl) Si (OCH$_3$)$_2$, (phenyl)$_2$ Si (OCH$_3$)$_2$ and (cyclopentyl)$_2$ Si (OCH$_3$)$_2$. 1,3-diethers having the formulae described above can also be used advantageously. If the internal donor is one of these dieters, the external donors can be omitted.

In order to obtain the compositions of the invention in flowable spherical particles having the said internal voids and permeability, it is critical that the solid catalyst component present the following properties:

surface area less than 100 $m^2/g$, preferably from 50 to 80 $m^2/g$;

porosity: from 0.25 to 0.4 cc/g;

both surface area and porosity being determined with the B.E.T. method (for instance by using a SORPTOMATIC 1800-C. Erba).

The catalyst component can be prepared, for example, with the following methods.

A magnesium chloride adduct with alcohols, containing generally 3 moles alcohol per mole MgCl$_2$, is obtained in spherical particles by emulsifying the adduct, in the molten state, in an inert hydrocarbon liquid immiscible with the adduct, and then cooling the emulsion very quickly in order to cause a solidification of the adduct in spherical particle form.

The particles then undergo a partial dealcoholation by way of a heating cycle at temperatures from 50° C. and 130° C., which brings the alcohol content from 3 to 1–1.5 moles per mole $MgCl_2$.

The adduct is then suspended in cold $TiCl_4$ (typically at 0° C.), at a concentration of 40–50 g/l, and then brought to 80–135° C. where it is maintained for 1–2 hours.

An electron-donor compound is added to the $TiCl_4$.

The excess $TiCl_4$ is separated hot by way of filtration or sedimentation, and the treatment with $TiCl_4$ and, optionally, with the electron-donor compound, is repeated one or more times; afterwards, the solid is washed with an inert solvent (for example, heptane or hexane) and then dried.

The catalyst component thus obtained presents the following characteristics:

surface area less than 100 $m^2/g$, preferably from 50 to 80 $m^2/g$;

porosity: from 0.25 to 0.4 cc/g;

a pore volume distribution wherein more than 50% of the total volume of said pores have a radius greater than 100 Å;

X-ray spectrum: presence of halo with maximum intensity at $2\zeta$ angles from 33.5° and 35°, and where there is no reflection at $2\zeta=14.95°$.

Examples of these catalyst components and of heterophasic compositions prepared by using them in sequential polymerization are reported in European published patent applications 395083, 400333 and 472946.

As previously said, the polymerization process can be carried out in at least two sequential steps, wherein the polyolefinic phases are prepared in separate subsequent steps, operating in each step, except the first step, in the presence of the polymer formed and the catalyst used in the preceding step. The catalyst is generally added only in the first step, however its activity is such that it is still active for all the subsequent step(s).

The regulation of the molecular weight is carried out by using known regulators, hydrogen in particular.

By properly dosing the concentration of the molecular weight regulator in the relevant steps, the previously described MFR and [η] values are obtained.

The whole polymerization process, which can be continuous or batch, is carried out following known techniques and operating in liquid phase, in the presence or not of inert diluent, or in gas phase, or by mixed liquid-gas techniques. It is preferable to operate in gas phase. Generally there is no need for intermediate steps except for the degassing of unreacted monomers.

Reaction time, pressure and temperature relative to each step are not critical, however it is best if the temperature is from 20 to 100° C. The pressure can be atmospheric or higher.

The catalysts can be pre-contacted with small amounts of olefins (prepolymerization).

Depending on the physical state of the substances which are used as additives, one can use different variations in the preparation process of the concentrates.

If one uses liquid substances at room temperature, they can be added as such or with adequate diluents to the polymer particles constituting the matrix of the dispersions and concentrates.

If one uses substances which melt at temperatures lower than the melting or softening point of at least one of the polymer phases which make up the matrix of the dispersions and concentrates, said substances can be added in the molten state.

It is preferable to use materials which are liquid or when melted have a viscosity lower than 10 P.

In any case, the concentrates of the present invention can be prepared very simply, by feeding the matrix polymer particles and at least one additive in normal mixers for powders, and mixing for the desired residence time.

The preferred mixers are those having a velocity from about 150 rpm (for mixers with an internal volume of about 130 liters), up to 500 rpm (for mixers with a smaller internal volume of up to about 10 liters) which are thermoregulated. The use of thermoregulated mixers is particularly recommended in order to optimize and control the viscosity of the liquids and the meltable substances.

Normally, in order to obtain the dispersions and concentrates of the present invention with the best results, residence times in the mixers of a few minutes are sufficient.

The preparation of the dispersions and concentrates can be continuous or discontinuous.

The mixers are equipped with spray-feeders for the liquids, and hopper-feeders for the solids. The substances which can be fed in the molten state are normally melted in autoclaves under nitrogen.

With the processes described above it is possible to obtain concentrates with yields up to 100% with respect to the additives.

The following examples are given to illustrate and not limit the present invention.

EXAMPLE 1

Nonextruded particles of olefin polymers to be used as matrix of concentrates according to the present invention are prepared by sequential polymerization.

The solid catalyst component used in polymerization is a highly stereospecific Ziegler-Natta catalyst component supported on magnesium chloride, containing about 3.0% by weight of titanium and diisobutylphthalate as internal donor, prepared by analogy with the method described in the examples of European published patent application 472946 and having the characteristics of porosity and surface area in the range previously described.

CATALYST SYSTEM AND PREPOLYMERIZATION TREATMENT

Before introducing it into the polymerization reactors, the solid catalyst component described above is contacted at −5° C. for 5 minutes with aluminum triethyl (TEAL) and dicyclopentyldimethoxysilane (DCPMS), in a TEAL/DCPMS weight ratio equal to about 10 and in such quantity that the TEAL/Ti molar ratio be equal to 68.

The catalyst system is then subjected to prepolymerization by maintaining it in suspension in liquid propylene at 20° C. for about 20 minutes before introducing it into the first polymerization reactor.

POLYMERIZATION

The polymerization is carried out in continuous in a series of 2 gas phase reactors equipped with devices for the transfer of the product coming from the reactor immediately preceding to the one immediately following.

In gas phase the hydrogen and the monomer(s) are analyzed in continuous and fed in such a manner that the desired concentration be maintained constant.

Into the first gas phase polymerization reactor a polypropylene homopolymer is produced by feeding in a continuous and constant flow the prepolymerized catalyst system, hydrogen (used as molecular weight regulator) and propylene monomer in the gas state.

The polymer produced in the first reactor is discharged in the second reactor where, after a sample is removed, ethylene and butene monomers in the gas state are fed.

The polymer particles exiting the reactors are subjected to a steam treatment to remove the reactive monomers and volatile substances, and then dried.

Polymerization conditions, molar ratio of the reactants and composition of the polymers obtained are shown in Table 1.

TABLE 1

| FIRST REACTOR | | |
|---|---|---|
| Temperature | ° C. | 70 |
| C3 | wt % | 100 |
| MFR (ASTM D 1238L) | g/10 min. | 110 |
| Xylene insoluble | wt % | 96.5 |
| SECOND REACTOR | | |
| Temperature | ° C. | 65 |
| C4/(C2 + C4) | Feed ratio | 0.5 |
| FINAL PRODUCT | | |
| MFR | g/10 min. | 0.7 |
| Xylene insoluble* | wt % | 57 |
| C2 | wt % | 55 |
| C3 | wt % | 28 |
| C4 | wt % | 17 |
| Xilene soluble I.V.** | dl/g | 2.5 |
| Flexural modulus (ASTM D 790) | Mpa | 140 |
| Izod-50° C. (ASTM D 256) | J/m | N.B. |
| Pore volume*** | mm$^3$/g | 290 |
| Surface area*** | m$^2$/g | 0.5 |

Note: C2 = ethylene; C3 = propylene; C4 = butene-1; wt % content by weight with respect to the polymer; I.V. = Intrinsic Viscosity; N.B. = No Break.
*A weighed amount of sample is dissolved in ortho-xylene at 135° C. controlled temperature or under reflux conditions. The solution is cooled under agitation in 20 minutes and maintained at 25° C. so that the insoluble material precipitates. The precipitate is then filtered with paper filter. After filtration, the solution is evaporated under nitrogen flux, dried under vacuum at 80° C. for 1 day and weighed.
**A weighed amount of the sample is dissolved in tetrahydronaphtalene at 135° C. The flow time of this diluted solution is determinated in a suitable suspended level viscosimeter supplied by SEMATECH which is thermostated at 135° C. temperature. Intrinsic viscosity is calculated by Solomon-Ciuta equation.
***The pore volume is the volume of mercury introduced, as determined by measuring the change in capacitance of the column of mercury in the capillary with a cylindrical outer tube in the mercury porosimeter The apparatus is a "Porosimeter 2000" from Carlo Erba, the surface area is calculated according to the softare "Milestone 200

EXAMPLE 2

Nonextruded particles of olefin polymers to be used as matrix of concentrates according to the present invention are prepared by sequential polymerization.

The solid catalyst component used in polymerization is a highly stereospecific Ziegler-Natta catalyst component supported on magnesium chloride, containing about 3.5% by weight of titanium and diisobutylphthalate as internal donor, prepared by analogy with the method described in the examples of European published patent application 472946 and having the characteristics of porosity and surface area in the described ranges.

CATALYST SYSTEM AND PREPOLYMERIZATION TREATMENT

Before introducing it into the polymerization reactors, the solid catalyst component described above is contacted at −5° C. for 5 minutes with aluminum triethyl (TEAL) and dicyclopentyldimethoxysilane (DCPMS), in a TEAL/DCPMS weight ratio equal to about 5.

The catalyst system is then subjected to prepolymerization by maintaining it in suspension in liquid propylene at 20° C. for about 20 minutes before introducing it into the first polymerization reactor.

POLYMERIZATION

The polymerization is carried out in continuous in a series of 3 gas phase reactors equipped with devices for the transfer of the product coming from the reactor immediately preceding to the one immediately following.

In gas phase the hydrogen and the monomer(s) are analyzed in continuous and fed in such a manner that the desired concentration be maintained constant.

Into the first gas phase polymerization reactor a propylene/ethylene random copolymer is produced by feeding in a continuous and constant flow the prepolymerized catalyst system, hydrogen (used as molecular weight regulator), propylene and ethylene in the gas state.

The polymer produced in the first reactor is discharged in the second reactor where, after a sample is removed, ethylene and propylene in the gas phase are fed. The polymer produced in the second reactor is discharged in the third reactor where ethylene and butene are fed.

The polymer particles exiting the reactors are subjected to a steam treatment to remove the reactive monomers and volatile substances, and then dried.

Polymerization conditions, molar ratio of the reactants and composition of the polymers obtained are shown in Table 2.

TABLE 2

| FIRST REACTOR | | |
|---|---|---|
| Temperature | ° C. | 70 |
| C2 | wt % | 3 |
| MFR | g/10 min. | 20 |
| Xylene insoluble | wt % | 95 |
| SECOND REACTOR | | |
| Temperature | ° C. | 65 |
| C2/(C2 + C3) | Feed ratio | 0.13 |
| C2 | wt % | 20 |
| MFR | g/10 min. | 0.2 |
| Xilene soluble I.V. | dl/g | 3.9 |
| THIRD REACTOR | | |
| Temperature | ° C. | 70 |
| C4/(C2 + C4) | Feed ratio | 0.5 |
| C4 | wt % | 24 |
| FINAL PRODUCT | | |
| MFR | g/10 min. | 0.1 |
| Xylene insoluble | wt % | 36 |
| C2 | wt % | 33 |
| C3 | wt % | 62 |
| C4 | wt % | 5 |
| Xilene soluble I.V. | dl/g | 4 |
| Flexural modulus | MPa | 40 |
| Izod-50° C. | J/m | N.B. |
| Pore volume | mm$^3$/g | 270 |
| Surface area | m$^2$/g | 0.4 |

EXAMPLE 3

Nonextruded particles of olefin polymers to be used as matrix of concentrates according to the present invention are prepared by sequential polymerization.

The solid catalyst component used in polymerization is a highly stereospecific Ziegler-Natta catalyst component as described in example 1 and having the following characteristics:

porosity=0.271 cc/g
surface area=69 m²/g.

CATALYST SYSTEM AND PREPOLYMERIZATION TREATMENT

Before introducing it into the polymerization reactors, the solid catalyst component described above is contacted at −5° C. for 5 minutes with aluminum triethyl (TEAL) and dicyclopentyldimethoxysilane (DCPMS), in a TEAL/DCPMS weight ratio equal to about 4 and in such quantity that the TEAL/Ti molar ratio be equal to 65.

The catalyst system is then subjected to prepolymerization by maintaining it in suspension in liquid. propylene at 20° C. for about 20 minutes before. introducing it into the first polymerization reactor.

POLYMERIZATION

The polymerization is carried out in continuous in a series of 2 gas phase reactors equipped with devices for the transfer of the product coming from the reactor immediately proceeding to the one immediately following.

In gas phase the hydrogen and the monomer(s) are analyzed in continuous and fed in such a manner that the desired concentration be maintained constant.

Into a first gas phase polymerization reactor a propylene/ethylene random copolymer is produced by feeding in a continuous and constant flow the prepolymerized catalyst system, hydrogen (used as molecular weight regulator), propylene and ethylene monomers in the gas state.

The polymer produced in the first reactor is discharged in the second reactor where, after a sample is removed, ethylene and propylene in the gas phase are fed The polymer particles exiting the reactors are subjected to a steam treatment to remove the reactive monomers and volatile substances, and then dried.

Polymerization conditions, molar ratio of the reactants and composition of the polymers obtained are shown in Table 3.

TABLE 3

| FIRST REACTOR | | |
|---|---|---|
| Temperature | ° C. | 75 |
| C2 | wt % | 3 |
| MFR | g/10 min. | 25 |
| Xylene insoluble | wt % | 94 |
| SECOND REACTOR | | |
| Temperature | ° C. | 60 |
| C2/(C2 + C3) | Feed ratio | 0.16 |
| C2 | wt % | 27 |
| MFR | g/10 min. | 0.6 |
| Xilene soluble I.V. | dl/g | 3.2 |
| FINAL PRODUCT | | |
| MFR | g/10 min. | 0.6 |
| Xylene insoluble | wt % | 36 |
| C2 | wt % | 20 |
| Xylene soluble I.V. | dl/g | 3.2 |
| Flexural modulus | MPa | 80 |
| Pore volume | mm³/g | 258 |
| Surface area | m²/g | 0.3 |

EXAMPLE 4

A polymer is prepared using catalyst system and polymerization apparatus of Example 3. Into the first gas phase polymerization reactor a polypropylene homopolymer is produced by feeding in a continuous and constant flow the prepolymerized catalyst system and propylene gas, while propylene and ethylene are fed in second and third reactors.

Polymerization conditions, molar ratio of the reactants and composition of the polymers obtained are shown in Table 4.

TABLE 4

| FIRST REACTOR | | |
|---|---|---|
| Temperature | ° C. | 80 |
| C3 | wt % | 100 |
| MFR | g/10 min. | 144 |
| Xylene insoluble | wt % | 98 |
| SECOND REACTOR | | |
| Temperature | ° C. | 60 |
| C2/(C2 + C3) | Feed ratio | 0.21 |
| C2 | wt % | 17 |
| MFR | g/10 min. | 12 |
| Xilene soluble I.V. | dl/g | 2.35 |
| FINAL PRODUCT | | |
| MFR | g/10 min. | 2.6 |
| Xylene insoluble | wt % | 47 |
| C2 | wt % | 40 |
| Xylene soluble I.V. | dl/g | 2.7 |
| Flexural modulus | Mpa | 80 |
| Pore volume | mm³/g | 231 |
| Surface area | m²/g | 0.4 |

Samples of the polymer particles prepared in the previously reported Examples 1–5 are sectioned and analyzed with SEM microscopy. A large majority of such particles show internal voids as previously described and illustrated in FIG. 1.

At higher magnification, domains of two separate polymer phases appear, one of which generally surrounds the previously said cavities. The latter polymer phase is constituted by rubbery polymer and results to be immiscible with the rest of the polymer even after repeated processing steps in the molten state.

EXAMPLE 5

This example is aimed at illustrating a controlled rheology PP application. In a powders mixing unit (Loedige) equipped with spray—feeder for liquids, 7 Kg of polymer material from Example 3 is introduced togheter with 3 Kg of Luperox 101 (2,5-dimethyl-2,5-bis(tert-butyl peroxy) hexane) maintaining the mixing velocity at 150 rpm. After three minutes of mixing the concentrate is discharged, giving a free flowing material containing 30% by weight of Luperox 101. The concentrate thus obtained is added in an amount of 0.3% by weight to Moplen YD50G (Montell, PP homopolymer with MFR<0.3g/10 min.) in a 45 mm twin screw extruder (Maris) at 260° C. The so obtained granules have MFR=7 g/1 0 min.

EXAMPLE 6

This example is aimed at illustrating a silane crosslinking application in cables. The polymer material of Example 2 is tumble mixed in a closed drum with 3.5% by weight of Silcat VS-735/1 (vinyltrimethoxysilane mixture from Witco) giving a dry and flowable dispersion. Immediately after the dispersion is blended with 70% by weight of LL 18K FA (Shell, LLDPE having density=0.918 g/cc, MFRE=1 g/10 min.) in pellet form and fed into a 45 mm mono-screw cable extruder. Barrel temperatures are between 160 and 220° C. (5 zones), cross-head and die temperature are respectively 230° C. and 250° C. After extrusion on a solid core copper conductor of 1.38 mm diameter an insulated cable showing an excellent smooth. cable surface is produced. The insulation is water cured after immersion of the cable into hot water at 90° C. for 4 hours. On the stripped insulation the properties showed in Table 5 are measured.

TABLE 5

| Measured property | Unit | Value |
|---|---|---|
| Tensile strength at break (ASTM D 412) | MPa | 20 |
| Elongation at break (ASTM D 412) | % | 455 |
| Hot set test at 200° C. (15 min, 20 N/cm² IEC 540) | % | 50 |

EXAMPLE 7

This example is aimed at illustrating a silane crosslinking application in cables. The polymer material of Example 1 is tumble mixed in a closed drum with 1.5% by weight of Silcat VS-735/1 (Witco) giving a dry and flowable dispersion. Immediately after the dispersion is fed into a 45 mm mono-screw cable extruder. Barrel temperatures are between 160 and 220° C. (5 zones), cross-head and die temperature are respectively 230° C. and 250° C. After extrusion on a solid core copper conductor of 1.38 mm diameter an insulated cable showing an excellent smooth cable surface is produced. The insulation is water cured after immersion of the cable into hot water at 90° C. for 4 hours. On the stripped insulation the properties showed in Table 6 are measured.

TABLE 6

| Measured property | Unit | Value |
|---|---|---|
| Tensile strength at break | MPa | 22 |
| Elongation at break | % | 623 |
| Hot set test at 200° C. (15 min., 20 N/cm²) | % | 30 |
| Hot set test at 250° C. (15 min., 20 N/cm²) | % | 30 |

EXAMPLE 8

This example is aimed at illustrating a plasticized TPO foil.

16 Kg of polymer material from Example 3 is tumble mixed in a closed drum for 5 minutes with 4 Kg of Celtis 902 (technical oil), giving a dry and flowable concentrate. This concentrate is fed at 10 Kg/hour into a 60 mm single screw extruder (Bandera, Italy) equipped with a 800 mm large cast die, together with the polymer material from Example 3 (as such) fed at the same time at 10 Kg/hour. Temperature barrel profile used is 150° C.–200° C. A smooth foil 1.2 mm thick is obtained. The properties of this foil are compared in Table 7 with a foil produced from non plasticized material from Example 3, fed to the same extruder at 20 Kg/hour.

TABLE 7

| Measured property | Unit | Foil from Example 3 Value | Plasticized foil Value |
|---|---|---|---|
| Tensile strength at break | MPa | 21 | 17 |
| Elongation at break | % | 600 | 900 |
| Hardness Shore A (ASTM D 2240) | — | 90 | 80 |

EXAMPLE 9

This example is aimed at illustrating a peroxide dynamically crosslinked TPO for extruded profile and injection molding applications. 20 Kg of polymer material from Example 3 is tumble mixed in a closed drum for 5 minutes with 0.4 Kg triallylisocyanurate (crosslinking coagent) and 0.25 Kg of Luperox 101 (liquid peroxide), giving a dry and flowable dispersion. This material is fed at 6 Kg/hour into a 45 mm double screw extruder (Maris, Italy), together with polymer material from Example 3 (as such) fed at the same time at 14 Kg/hour. Temperature barrel profile used is 150° C.–200° C. Pellets are compression molded and properties found are reported in Table 8

TABLE 8

| Measured property | Unit | Material from Example 3 Value | Dynamically X-linked TPO Value. |
|---|---|---|---|
| Tension set 100% at 23° C. (ASTM D 412) | % | 45 | 30 |
| Tension set 100% at 70° C. | % | 48 | 25 |
| Tension set 100% at 100° C. | % | 40 | 24 |
| Tensile strength at break | Mpa | 21 | 16 |
| Elongation at break | % | 600 | 560 |
| Hardness Shore A | — | 90 | 90 |

EXAMPLE 10

This example is aimed at illustrating plasticized, peroxide dynamically crosslinked TPO for extruded profile and injection molding applications.

16 Kg of material from Example 3 is tumble mixed in a closed drum for 5 minutes with 4 Kg of Celtis 911 (plasticizer oil), and 0.5 Kg of Luperox 101 (peroxide) and 0.8 Kg triallylisocyanurate (crosslinking coagent), giving a dry and flowable concentrate. This concentrate is fed at 18 Kg/hour into a 45 mm double screw extruder (Maris, Italy). Temperature barrel profile used is 150° C.–220° C. Pellets are compression molded and properties found are reported in Table 9.

Control Test

In order to confirm that the additives are absorbed in the voids of the polymer particles, the following test is carried out.

30 grams of polymer from Example 2 is gently shaked in a closed glass flask with 5% of methylene blue colorant solution for 1 minute. After that, the content of the flask is spilled on a white absorbent laboratory paper. Material looks dry and not staining. Some spheres appears perfectly white or opaque, some spheres appears light blue. Some of these spheres are half-cutted with a micro knife and observed at the microscope. The white spheres appears internally white solid and uniform. The light blue spheres appear empty and blue into the core. Conclusion is that the liquid solution migrates inside the polymer particles without leaving meaningfull amounts of liquid on the surface.

TABLE 9

| Measured property | Unit | Dynamically X-linked plasticized TPO Value |
|---|---|---|
| Tension set 100% at 23° C. | % | 27 |
| Tension set 100% at 100° C. | % | 28 |
| Tensile strength at break | Mpa | 13 |
| Elongation at break | % | 750 |
| Hardness Shore A | — | 70 |

What is claimed is:

1. A dispersion of one or more additives to be used in the processing of olefin polymers or copolymers, said dispersion comprising nonextruded particles of olefin polymers containing at least two immiscible polyolefinic phases and having internal voids partially or totally filled by the said additive or additives, wherein the amount of additive or additives present in the said internal voids is from 0.5 to 25% by weight with respect to the total weight of the dispersion.

2. The dispersion of claim 1, in the form of a concentrate of one or more additives to be used in the processing of olefin polymers or copolymers, said concentrate comprising nonextruded particles of olefin polymers containing at least two immiscible polyolefinic phases and having internal voids partially or totally filled by the said additive or additives, wherein the amount of additive or additives present in the said internal voids is from 5 to 25% by weight with respect to the total weight of the concentrate.

3. The dispersion of claim 1, wherein the olefin polymers that constitute the immiscible polyolefinic phases are polymers or copolymers, and their mixtures, of R—CH=CH$_2$ olefins where R is selected from the group consisting of a hydrogen atom, a C$_1$–C$_8$ alkyl radical, and an aryl radical.

4. The dispersion of claim 1, wherein the polymer particles contain from 15% to 75% by weight of polymerized ethylene.

5. The dispersion of claim 1 wherein the amount of additive or additives present in the internal voids is from 0.5 to 20% by weight.

6. The dispersion of claim 2 wherein the amount of additive or additives present in the internal voids is from 10 to 20% by weight.

7. The dispersion of claim 3 wherein the aryl radical is a phenyl radical.

8. A process for making a dispersion of one or more additives in olefin polymers comprising blending the additives with nonextruded particles of olefin polymers containing at least two immiscible polyolefinic phases and having internal voids, so that the additives partially or totally fill the voids and the amount of additive present in the internal voids is from 0.5 to 25% by weight with respect to the total weight of the dispersion.

* * * * *